United States Patent
Mannava et al.

[11] Patent Number: 5,846,054
[45] Date of Patent: Dec. 8, 1998

[54] LASER SHOCK PEENED DOVETAILS FOR DISKS AND BLADES

[75] Inventors: Seetharamaiah Mannava; Albert E. McDaniel, both of Cincinnati; William D. Cowie, Xenia; Herbert Halila, Cincinnati, all of Ohio

[73] Assignee: General Electric Company, Cincinnati, Ohio

[21] Appl. No.: 319,345

[22] Filed: Oct. 6, 1994

[51] Int. Cl.[6] ........................................ F01D 5/30
[52] U.S. Cl. ........................................ 416/219 R; 416/222
[58] Field of Search ........................... 416/219 R, 222 R

[56] References Cited

U.S. PATENT DOCUMENTS 5,073,212  12/1991  Frohlich ................................ 148/903

FOREIGN PATENT DOCUMENTS 0070811  4/1984  Japan .................................. 416/222 R

OTHER PUBLICATIONS

Publication, "Laser shock processing Increases the fatgue Life of Metal Parts" Materials & Processing report. Sep. 1991.

*Primary Examiner*—Edward K. Look
*Attorney, Agent, or Firm*—Andrew C. Hess; Nathan D. Herkamp

[57] ABSTRACT

A dovetail assembly for mounting blades with dovetail roots axially into disk dovetail slots around a disk periphery which is subject to a tensile stress field due to centrifugal and thermal growth induced forces generated by the rotor when the rotor is rotating. The dovetail assembly has stress risers each in the form of a transition fillet between a neck or an area of minimum width and a pressure face which is designed to be a contact surface between complementary blade dovetail roots and disk dovetail slots formed between adjacent disk posts. The region around the stress riser has deep compressive residual stresses imparted by laser shock peening and is radially adjacent the stress riser and extends inward from a laser shocked surface of the component along the transition fillet.

2 Claims, 4 Drawing Sheets

LASER SHOCK PEENED DOVETAILS FOR DISKS AND BLADES

RELATED PATENT APPLICATIONS

The present Application deals with related subject matter in co-pending U.S. patent application Ser. No. 08/319,346, entitled "LASER SHOCK PEENED ROTOR COMPONENTS FOR TURBOMACHINERY", filed Oct. 6, 1994, assigned to the present Assignee, and having three inventors in common with the present application.

The present Application deals with related subject matter in co-pending U.S. patent application Ser. No. 08/319,396, entitled "LASER SHOCK PEENED SHAFT SPLINES FOR TURBOMACHINERY", filed Oct. 6, 1994, assigned to the present Assignee, and having two inventors in common with the present application.

The present Application deals with related subject matter in co-pending U.S. patent application Ser. No. 08/319,389, entitled "LASER SHOCK PEENED DISKS WITH LOADING AND LOCKING SLOTS FOR TURBOMACHINERY", filed Oct. 6, 1994, assigned to the present Assignee, and having two inventors in common with the present application.

BACKGROUND OF THE INVENTION

1. Field of the Invention

This invention relates to turbomachinery rotor components and assemblies having discontinuities about which form stress concentrations during rotor operation, often referred to as stress risers and, more particularly, to turbomachinery rotor components having localized compressive residual stress zones imparted in the areas of these stress risers by laser shock peening.

2. Description of Related Art

Turbomachinery such as gas turbine engines and, in particular, aircraft gas turbine engines operate rotors at high rotational speeds that subject the rotor's components to very high tensile stress fields particularly at radially outer edges of the rotors. These rotors are designed to operate in high tensile stress fields and often contain features that are stress risers which subject the components to fatigue failure and reduced life. In some applications (such as are in use in advanced, high tip-speed, gas turbine engines), the rim area of a rotating disk is subjected to exceptionally high stresses. The stresses include tension stresses in the circumferential direction called hoop stress and causes life limiting low cycle fatigue around areas of stress concentration, such as bolt holes, blade loading and locking slots, axial dovetail blade root slots, rabbets, and other stress risers. It is expensive to refurbish and/or replace disks and other rotor components in a gas turbine engine and therefore any means to enhance the rotor capability and in particular to extend aircraft engine component life is very desirable. The present solution to the problem of extending the life of these aircraft engine components is to design adequate margins by reducing stress levels to account for bolt hole and other stress concentration features or stress risers. This is typically done by increasing thicknesses locally, thus adding unwanted weight to the rotor, in combination with expensive features such as shaped holes and scalloped flanges. In order to ensure safe and reliable operation of older engines for extended service life, expensive redesign efforts or frequent replacement of suspect parts are required. This is expensive and obviously reduces customer satisfaction.

Blades are often mounted to the disk by dovetail assemblies which include a blade dovetail root at the radially innermost portion of a blade received in an axially extending disk dovetail slot. The dovetail slot is a stress riser as noted above. Friction occurs between opposing face portions of the dovetail root and slot during engine operation producing high dynamic stresses or stress risers which causes high cycle fatigue along areas of the disk and blade surrounding these dovetail contacting faces of the slot and the root. This problem is found mainly in fans and compressors causing cracking in the dovetail region on both blade shanks and disk posts. This cracking due to low cycle fatigue is found in the post below the pressure face at two tangency points of a fillet (in cross-section) used to transition to the post shank. Cracking due to high cycle fatigue is found on the post at a point just below the contact surface on the post where tearing due to vibrations occur. This cracking due to low cycle fatigue is found in the in the blade just above the pressure face at a tangency point (in cross-section) of a fillet used to transition from the root to shank. Cracking due to high cycle fatigue is found on the blade at a point just above the contact surface on the blade where tearing due to vibrations occur. On a typical blade these points often are close together or even coincide. At these points, at which stress risers exist, are areas of high stress due to centrifugal and thermal growth induced forces. This high cycle fatigue problem is also highly undesirable because of the expense to refurbish and/or replace disks and blades as well as the obvious benefit of extending the life of these aircraft engine components. The current solution to the problem, if possible, is to re-contour the dovetail slot to desensitize the design to frictional effects, remove damaged material, and decrease the high local stresses.

Another rotor component subject to cracking and failure is a splined rotor shaft coupling such as those usually employed in the shafting connecting the power turbine which must be capable of transferring large torque loading. Failure of a spline in a power turbine shaft usually results in an overspeed of the low pressure turbine rotor system resulting in uncontained blading or disk separation. The conventional method to overcome the problem of spline tooth failure is to alter the spline design and construction to account for factors such as fuel system oscillations, shaft torsional induced "wind up" causing high stress in the ends of spline teeth, shaft ellipticity, pilot eccentricity, and tooth-tooth spacing errors. This is a costly and complex method of extending the useful lives of spline couplings. There also remains a significant number of engines in the field and engine designs for which these factors cannot be taken into account because of commercial or technical reasons.

Therefore, it is highly desirable to design and construct longer lasting rotor components better able to resist both low and high cycle fatigue than present rotor components. To this end, the present invention is directed and provides the component with a region of deep compressive residual stresses imparted by laser shock peening around stress risers located in portions of the component subject to a tensile stress field due to centrifugal and thermal growth induced forces generated by the rotor when the rotor is rotating.

The region of deep compressive residual stresses imparted by laser shock peening of the present invention is not to be confused with a surface layer zone of a work piece that contains locally bounded compressive residual stresses that are induced by a hardening operation using a laser beam to locally heat and thereby harden the work piece such as that which is disclosed in U.S. Pat. No. 5,235,838, entitled "Method and apparatus for truing or straightening out of true work pieces". The present invention uses multiple radiation pulses from high power pulsed lasers to produce shock waves on the surface of a work piece similar to methods disclosed in U.S. Pat. No. 3,850,698, entitled "Altering Material Properties"; U.S. Pat. No. 4,401,477, entitled "Laser shock processing"; and U.S. Pat. No. 5,131,957, entitled "Material Properties". Laser peening as understood in the art and as used herein, means utilizing a laser beam from a laser beam source to produce a strong localized compressive force on a portion of a surface. Laser peening has been utilized to create a compressively stressed protection layer at the outer surface of a workpiece which is known to considerably increase the resistance of the workpiece to fatigue failure as disclosed in U.S. Pat. No. 4,937,421, entitled "Laser Peening System and Method". However, the methods disclosed in the prior art do not disclose how to produce rotor components having stress risers in areas of the component subject to tensile cyclic stress fields and/or vibratory stress fields. It is to this end that the present invention is directed.

SUMMARY OF THE INVENTION

The present invention provides turbomachinery rotors, which have dovetail assemblies for mounting blades with dovetail roots axially into disk dovetail slots around the disk periphery which is subject to a tensile stress field due to centrifugal and thermal growth induced forces generated by the rotor when the rotor is rotating. The dovetail assembly has stress risers each in the form of transition fillet between a neck or an area of minimum width and a pressure face which is designed to be a contact surface between complementary blade dovetail roots and disk dovetail slots formed between adjacent disk posts circumferentially disposed around a centerline axis of the rotor. The region of a component of the dovetail assembly around the stress riser has deep compressive residual stresses imparted by laser shock peening and is radially adjacent the stress risers and extends inward from a laser shocked surface of the component encompassed by the region. In one more particular embodiment, the component is a disk wherein the stress riser is a neck on the disk post radially inward of a pressure face on an interior facing surface of a dovetail slot in the disk. Another embodiment is a blade wherein the stress riser is a neck on the interface between the blade shank and root radially outward of a pressure face on an exterior facing surface of a dovetail blade root of the blade. The region of laser shocked compressive residual stresses and the laser shocked surface are radially outward of the face on the interface between a shank and a root of the blade wherein the shank generally connects the root to an airfoil of the blade.

ADVANTAGES

Among the advantages provided by the present invention is the improved ability to safely build turbomachinery and gas turbine engine rotors and rotor components designed to operate in high tensile stress fields with features that are stress risers which can better withstand fatigue failure and have an increased life over conventionally constructed rotors and their components. Another advantage of the present invention is that rotors and components can be constructed with commercially acceptable life spans without increasing thicknesses locally around the stress risers, as is conventionally done, thus avoiding unwanted weight on the rotor. The present invention makes it possible to provide new and refurbished rotors and rotor components that enhances rotor capability and in particular extends aircraft engine component life in order to reduce the number of refurbishments and/or replacements of disks and other rotor components in a gas turbine engine. The present invention allows aircraft engine rotor components to be designed with adequate margins by reducing stress levels to account for bolt hole and other stress concentration features or stress risers without beefing up the area around the stress risers or using other means which increase the weight of the rotor and engine. The present invention can be advantageously used to refurbish existing parts in order to ensure safe and reliable operation of older engine components while avoiding expensive redesign efforts or frequent replacement of suspect parts as is now often required.

BRIEF DESCRIPTION OF THE DRAWINGS

The foregoing aspects and other features of the invention are explained in the following description, taken in connection with the accompanying drawings where:

FIG. 1 is partial perspective illustrative view of an exemplary aircraft gas turbine engine rotor disk and blade assembly in accordance with the present invention.

DETAILED DESCRIPTION OF THE INVENTION

Figure 1A:
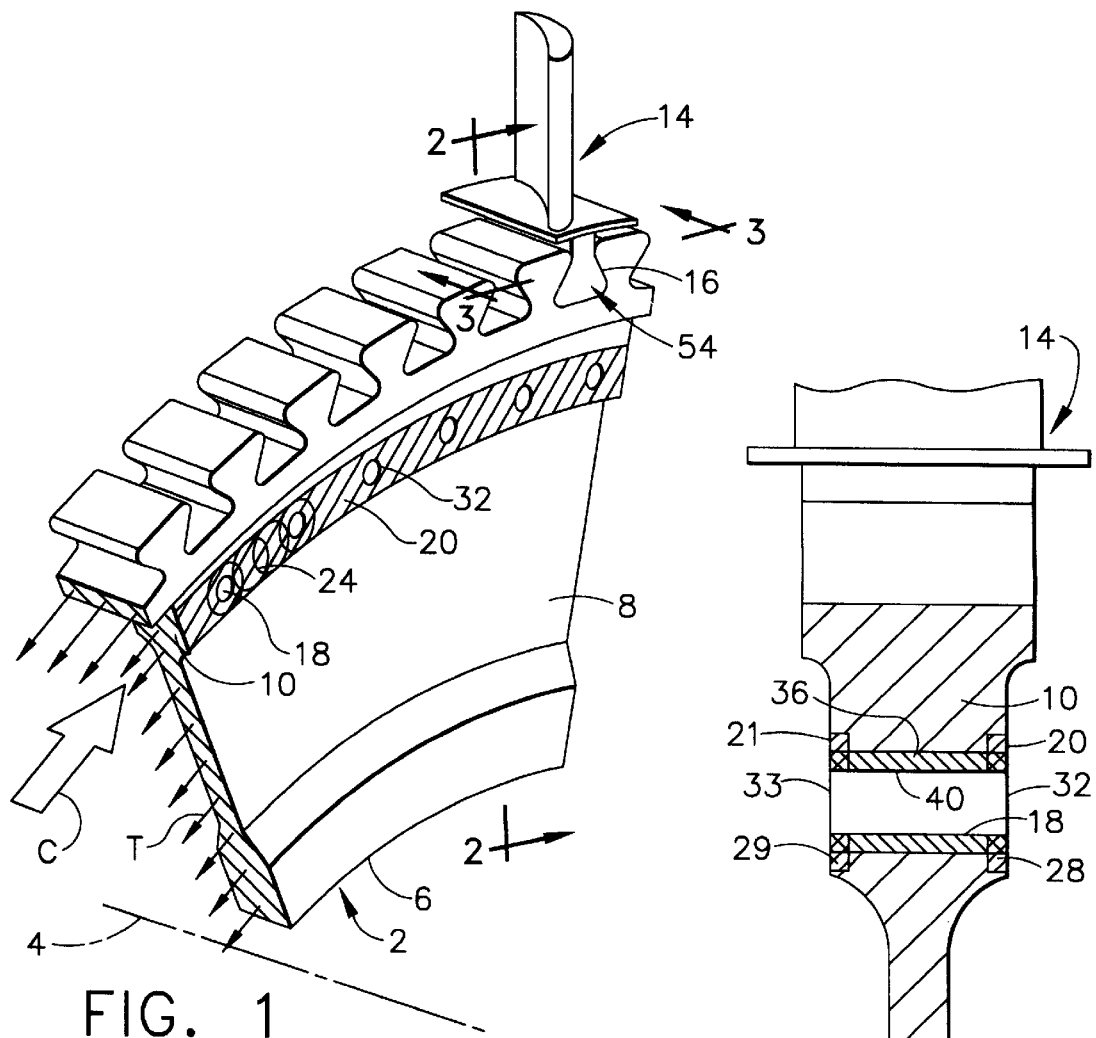
FIG. 1A is a graphic illustration of stress levels around a stress riser in a rotor component found in the prior art.
Figure 1A:
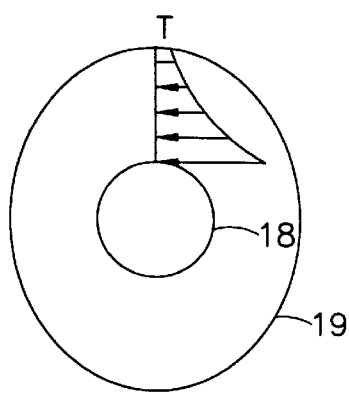
Figure 1B:
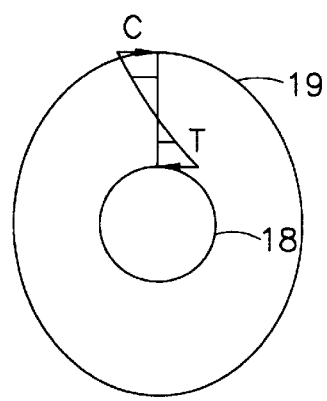
FIG. 1B is a graphic illustration of stress levels around a stress riser found in a rotor component in accordance with the present invention.
Figure 2:
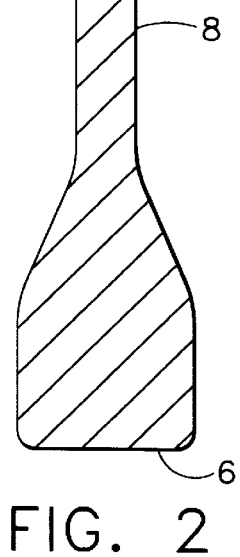
FIG. 2 is a transverse, partly sectional view through the disk and blade assembly taken along line 2—2 as illustrated in FIG. 1.

Illustrated in FIGS. 1 and 2 is a section of an exemplary aircraft gas turbine engine rotor disk 2 annularly disposed about a centerline axis 4 of a gas turbine engine (not shown) and having a bore 6 connected by a web 8 to a radially outward annular rim 10 through which bolt holes 18 are axially disposed. Rotor blades 14, which can be compressor or turbine blades, are mounted around the periphery 16 of the rim 10. The disk 2 and the blades 14 are components of the rotor (that is not shown in its entirety but well understood by those skilled in the art) that are subject to a significant three dimensional circumferentially oriented tensile stress field T due to hoop stress in the vicinity of the rim 10. This stress field is produced by centrifugal and thermal growth induced forces and torques generated by the rotor rotating and engine operation. An annular plurality of bolt holes 18 are circumferentially disposed around the rim 10 and are stress risers which cause tensile stress concentrations around the holes when the rotor is rotating.

The bolt holes 18 extend from an axially facing generally annular first surface 20 to an oppositely axially facing generally annular second surface 21. Each of the generally annular surfaces 20 and 21 are formed by laser beam induced shocks generally indicated by a circumferentially continuous plurality of overlapping laser shock circles 24 and therefore are referred to as laser beam shocked surfaces. The generally annular first and second surfaces 20 and 21 axially bound generally annular first and second regions 28 and 29 respectively which extend axially inward from their respective first and second surfaces. The first and second regions 28 and 29 have deep compressive residual stresses C imparted by the laser beam induced shocks indicated by the circles 24 by a process referred to as laser shock peening (LSP).

The laser beam shock induced deep compressive residual stresses C are generally about 50–150 KPSI (Kilo Pounds per Square Inch) extending from the laser shocked surfaces, such as the annular first and second surfaces 20 and 21, to a depth of about 20–50 mils into laser shock induced compressive residually stressed regions, such as the first and second regions 28 and 29. The laser beam shock induced deep compressive residual stresses C are produced by repetitively firing a high energy laser beam that is focused on the painted surface (such as 20 and 21) to create peak power densities having an order of magnitude of a gigawatt/$cm^2$. The laser beam is fired through a curtain of flowing water that is flowed over the painted surface and the paint is ablated generating plasma which results in shock waves on the surface of the material. These shock waves are re-directed towards the painted surface by the curtain of flowing water to generate travelling shock waves (pressure waves) in the material below the painted surface. The amplitude and quantity of these shockwave determine the depth and intensity of compressive stresses. The paint is used to protect the target surface and also to generate plasma. Ablated paint material is washed out by the curtain of flowing water.

The first and second regions 28 and 29 respectively encompass first and second ends of the holes 32 and 33 respectively. The holes 18 are generally centered along a circular line bisecting the regions 28 and 29 which are generally denoted as annular in shape for the purposes of this patent though they are formed by round laser beam induced shocks generally as indicated by the overlapping circles 24. Note that either one side or both sides of the disk 2 may be laser shock peened around the holes 18 though both sides are preferable.

The axially oriented interior annular surface of each of the holes 18 may also be laser shock peened to form an laser shock peened interior annular region 36. This may be done by orienting the laser beam perpendicular to the surface of disk 2, to create shocks as indicated by the overlapping circles 24. It is preferable to totally encompass the hole 18 as indicated with a laser shocked circular region 38 around each hole by firing the laser more times at this corresponding position than at the others overlapping positions. This laser shock peens the entire hole 18 including an interior surface 40 of the hole 18 with a laser beam centered along the centerline 41 of the hole itself with several pulses to create shocks as indicated by the overlapping circles 24 at 38 which totally encompasses the hole 18 as indicated such that the outer diameter of the shock circle 24 is two to three times larger than the outer diameter of the hole. It is also preferable to simultaneously laser shock peen the annular first and second surfaces 20 and 21 respectively to form the first and second regions 28 and 29 respectively from both sides of the disk 2. The present invention also includes shocking just around the holes 18 and not fully around the annular first and second surfaces 20 and 21, respectively.

Another method to form the laser shock peened interior annular region is to orbit the laser beam at an angle to the perpendicular with respect to the disk 2 and orbit the beam around an interior surface 40 of the hole 18 at an oblique angle to the interior surface 40 to form the laser shock peened interior annular region 36. The laser beam may be orbited or the disk 2 may be orbited to effect a coning motion of the laser beam within the hole 18. The hole 18 is generally regarded as a low cycle fatigue stress riser.

The tensile stress field around the hole 18 of the prior art without a laser shock peened region around the hole is illustrated in FIG. 1A as prior art. Note the particular high tensile stress T near the edge of the hole 18. Contrast this to the stress field around the hole 18 of the present invention having a laser shock peened region around the hole as illustrated in FIG. 1B wherein the deep compressive residual stresses C in the first region 28 counteracts a substantial portion of the elevated or stress concentrated portion of the tensile stress field T around the edge of the stress riser hole 18. This results in a stress distribution wherein there is compressive stress C near an outer edge 19 of the first region 28 and tensile stresses T around the edge of the hole 18 which is subjected to the concentrated tensile stresses during engine operation and rotor rotation. The absolute levels of stress, both compressive and tensile, are well below the highest values of tensile stress T in the prior art.

Figure 3:
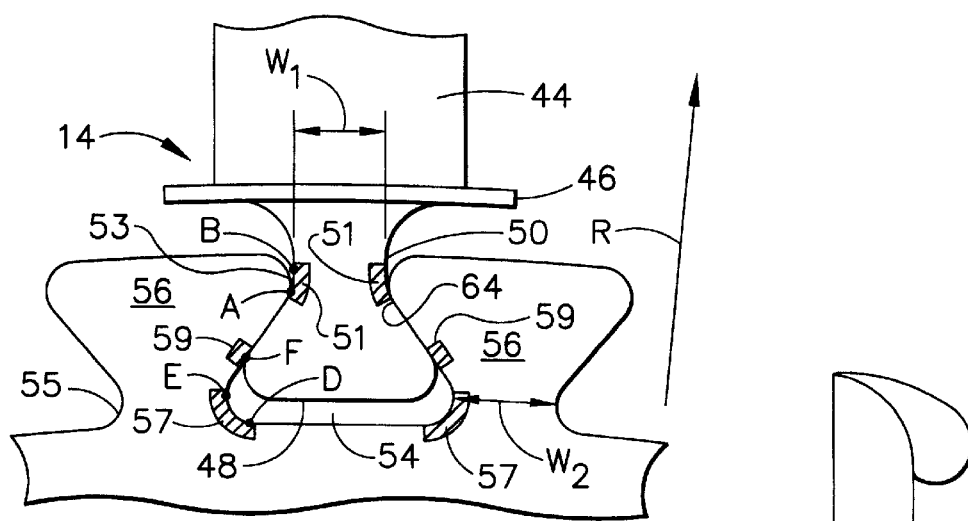
FIG. 3 is a cross sectional view of a portion of the blade and disk assembly taken along line 3—3 as illustrated in FIG. 1.
Figure 3A:
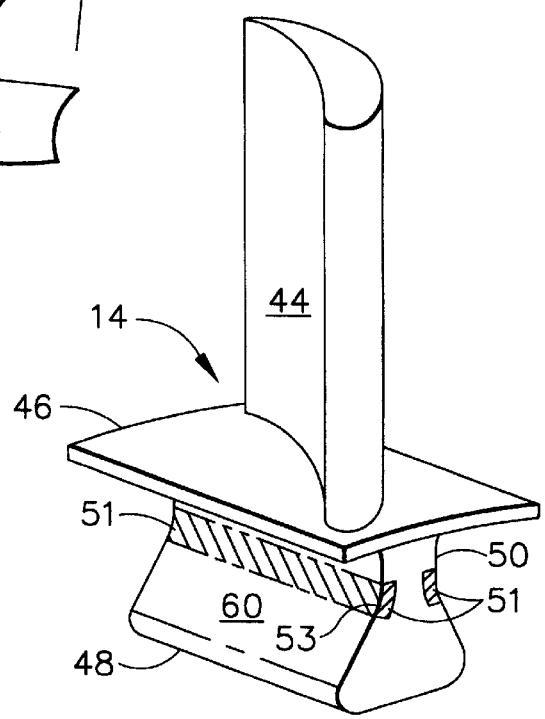
Figure 3B:
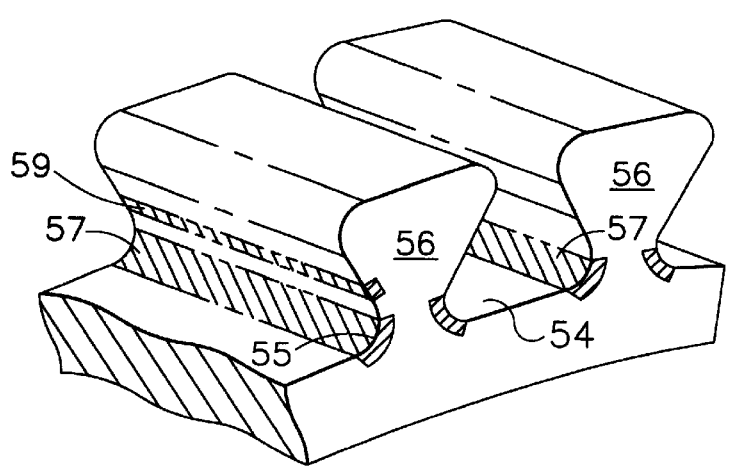

Illustrated in FIGS. 3, 3A and 3B is one of the rotor blades 14 mounted to the disk 2. Each of the rotor blades 14 has an airfoil 44 extending radially outward from a blade platform 46. A dovetail root 48 is connected to the platform 46 by a shank 50 with a conventional transition fillet at a root-to-shank interface 51 to reduce stress concentration effects (Kt) at the root-to-shank interface which is a stress riser because of the rapid transition, in cross section, between the minimum width of root neck W1 and a dovetail root pressure face 60 on the root 48. Centrifugal force of the blade 14 due to rotation of disk 2 produces a three dimensional tensile stress field oriented T in the radially outward direction R and the minimum width of root neck W1 produces a stress riser at the root-to-shank interface 51. The blades 14 are radially secured to the disk 2 by complementary dovetail slots 54 cut into the rim 10. The rotor disk 2 includes a plurality of circumferentially spaced apart, axially extending dovetail posts 56, adjacent ones of which define therebetween the generally axially extending dovetail slot 54. During operation of the engine as the rotor and its disk 2 rotate at very high rotational speeds the blades 14 are forced radially outward by centrifugal force generated by the rotating disk 2 and pull on the disk dovetail posts 56 producing tensile stress fields in the post oriented in the radial direction.

The root-to-shank interface 51, which typically has a conventional transition fillet 53 to reduce stress concentration effects (Kt) at the root-to-shank interface, has two tangency points A and B. Tangency point A is at a an end of the fillet 53 on the blade root 48 and tangency point B is at an end of the fillet 53 on the shank 50. The root-to-shank interface 51 is a region having deep compressive residual stresses C imparted by a laser shock peening encompasses both tangency points A and B. Two separate regions having deep compressive residual stresses encompassing tangency points A and B separately may be used.

The post-to-disk interface 57, which typically has a conventional transition fillet 55 or rounded interior corner to reduce stress concentration effects (Kt) at the post-to-disk interface, has two tangency points D and E. Tangency point D is at a circular outer surface S of the rim 10 and tangency point E is at a flat angular surface S1 upon which lies a dovetail slot pressure face 62. A minimum width of a post neck W2 produces a stress riser at the post-to-disk interface 57 at a point E (in the cross-sectional view) because of the rapid transition, in cross section, between the minimum width of post neck W2 and the dovetail slot pressure face 62. The post-to-disk interface 57 is a region having deep compressive residual stresses C imparted by a laser shock peening encompasses both tangency points D and E. Two separate regions having deep compressive residual stresses encompassing tangency points D and E separately may be used.

The dovetail root pressure face 60 on the root 48 and the dovetail slot pressure face 62 on the disk dovetail post 56 meet and slide against each other along a contact surface interface 64 between them. The dovetail slot growth due to high disk strain and vibration that the engine produces due to the engine rotation causes sliding frictional forces between the dovetail root pressure face 60 and the dovetail slot pressure face 62 which in turn is a low and high cycle fatigue stress riser producing additional vibratory stress concentrations at the root-to-shank interface 51 and the post-to-disk interface 57. The effects of this high cycle fatigue may be countered by a post region 59 having deep compressive residual stresses C imparted by laser shock peening on the post 56 at a point F just below the contact surface 64 where tearing due to vibrations occur. The region at post-to-disk interface 57 having deep compressive residual stresses covers a point just above the contact surface 64 where tearing due to vibrations occur on the blade and which generally coincides with point B. So that the region having deep compressive residual stresses at the post-to-disk interface 57 counters the effects of this high cycle fatigue on the blade.

The root-to-shank interface 51 and the post-to-disk interface 57 are regions having deep compressive residual stresses C imparted by a laser shock peening process similar to that described previously. Another advantage of the present invention is that the same laser shock peening machine or machine center can be used to produce the laser shock peened regions described herein.

Figure 4:
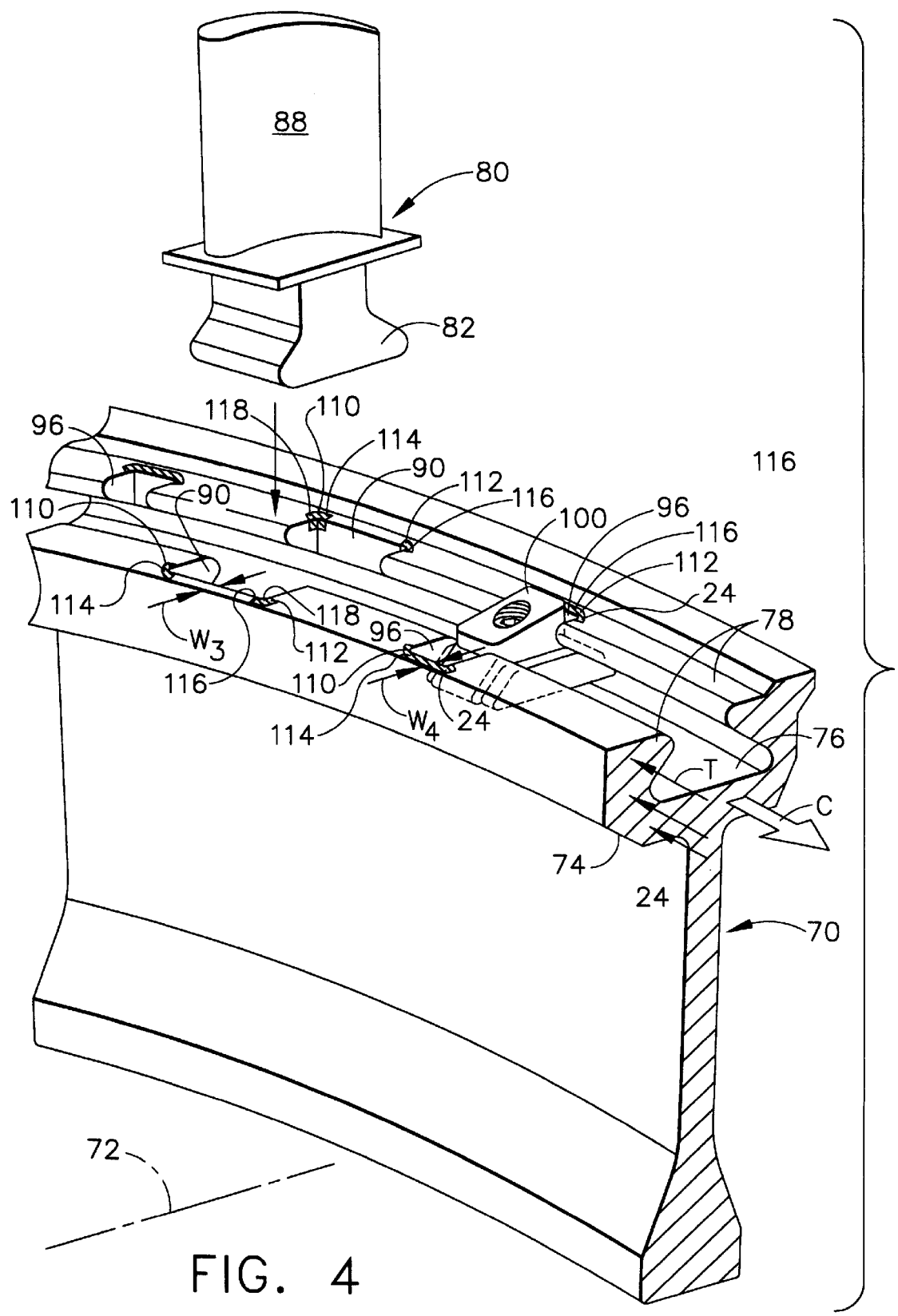
FIG. 4 is partial perspective illustrative view of an exemplary aircraft gas turbine engine rotor having a circumferentially extending dovetail slot for securing blades in accordance with the present invention.

Illustrated in FIG. 4 is another embodiment of the present invention illustrating a rotor component in the form of a disk 70, but which may have other forms such as a drum rotor, disposed about an engine centerline 72 having an annular rim 74 with a radially outward open annular channel 76, often referred to as a retaining slot, cut circumferentially around the rim. The annular channel 76 has outer annular overhanging rails 78 for securing the blades 80 to the rotor. The channel 76 is illustrated as having a circumferential oriented dovetail shape that accepts circumferential oriented dovetail roots 82 which are connected by a shank 84 to a platform 86 which in turn support airfoils 88 of the blades 80. The dovetail roots 82 are loaded into the annular channel 76 through a pair of opposing three sided loading slots 90 cut in the radial direction through the rails 78. Two pairs of opposing three sided blade locking slots 96 are cut in the radial direction through the rails 78 to provide for the insertion of two circumferential dovetail blade locks 100, only one of which is illustrated.

The loading slots 90 and locking slots 96 have stress risers which are surrounded by third and fourth laser shock peened regions 110 and 112 respectively that have deep compressive residual stresses C imparted by laser beam induced shocks and which extend radially inward from their respective third and fourth laser beam shocked surfaces 114 and 116. The stress riser of the loading slots 90 are the corners 118 because they provide a discontinuity between a minimum width of slot neck W3 with respect to the circumferential tensile stress field T due to the hoop stress in the circumferentially continuous rails 78. The entire locking slot 96 is a stress riser because they behave as if they have a single minimum width of slot neck W4 with respect to the circumferential tensile stress field T due to the hoop stress in the circumferentially continuous rails 78. The laser shock peened regions 110 and 112 are formed by laser beam induced shocks generally indicated by the portions of the circles 24 that cover the respective third and fourth laser beam shocked surfaces 114 and 116 of the rails 78.

Figure 5:
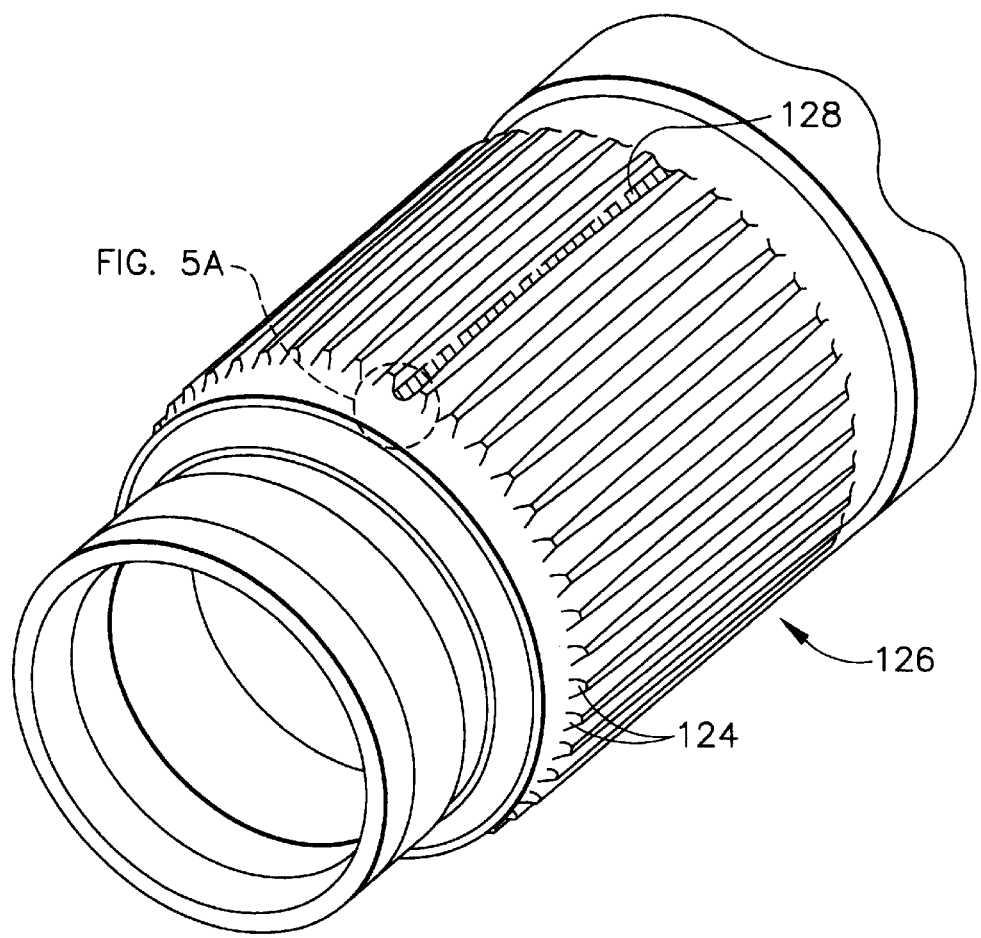
FIG. 5 is partial perspective illustrative view of a gas turbine engine rotor shaft splined end in accordance with the present invention.
Figure 5A:
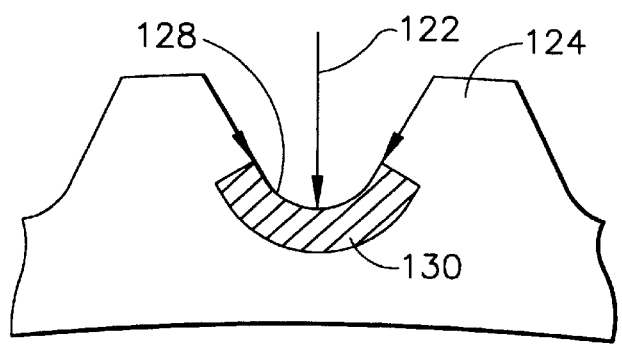
FIG. 5A is a transverse, partly sectional enlarged view of an area of the shaft splined encircled by a phantom line labelled FIG. 5A in FIG. 5.

Another rotor component subject to cracking and failure is a splined rotor shaft coupling 120 illustrated in FIGS. 5 and 5A. Splined shaft couplings are usually employed in the shafting connected to a power turbine or fan and must be capable of transferring large torque loading. Failure of a spline in a power turbine or fan shaft usually results in an overspeed of the low pressure turbine rotor system resulting in uncontained blading or disk separation. High stress occurs at each root radii 122 of each spline tooth 124 on a shaft 126 which is a stress riser in a tensile stress field T. The tensile stress field T is produced by the tremendous amount of torques transmitted though the shaft 126 and across the spline teeth 124. The root radii 122 is a stress riser because it is an area of spline tooth bending caused by transferring the transmitted shaft torque from one shaft to the mating connecting shaft through the spline teeth. Laser beam shocked curved surfaces 128 extend axially between adjacent spline teeth 124 and are curved about the root radii 122. Laser shock peened curved regions 130 having deep compressive residual stresses C imparted by laser beam induced shocks extend inward into the shaft from the laser beam shocked curved surfaces 128. The laser shock peened curved regions 130 between the spline teeth 124 reduce the effect of fatigue in these stress risers thereby extending the useful life of the shaft and spline teeth. The invention may also be used with female splines which are essentially grooves having root radii which are cut into a inner or outer cylindrical surface of the shaft as opposed to teeth which extend outward from the surface.

While the preferred embodiment of the present invention has been described fully in order to explain its principles, it is understood that various modifications or alterations may be made to the preferred embodiment without departing from the scope of the invention as set forth in the appended claims.

We claim:

1. A dovetail assembly component of a gas turbine engine for mounting blades around a rotor disk periphery, said dovetail assembly component comprising:

a metallic body having at least a portion of said body subject to a stress field due to forces generated by the engine's operation, at least one stress riser located in said portion that causes stress concentration in said stress field when the rotor is rotating, at least one region of the component around said stress riser having deep compressive residual stresses imparted by laser shock peening, said stress riser is a transition portion of the component between an area of minimum width, in cross section, and a pressure face of the component wherein said pressure face is a contact surface between a complementary dovetail blade slot and dovetail blade root formed between adjacent disk posts circumferentially disposed around a centerline axis of the disk, wherein said region extends inward from a laser shocked surface of the component along said transition portion of the component, wherein the component comprises a disk, said pressure face lies on an interior facing surface of a dovetail slot in said disk, and each of said region and laser shocked surface are radially inward of each of said faces, and said transition portion is a transition fillet at a post-to-disk interface of said disk posts and said disk.

2. A dovetail assembly component of a gas turbine engine for mounting blades around a rotor disk periphery, said dovetail assembly component comprising:

a metallic body having at least a portion of said body subject to a stress field due to forces generated by the engine's operation, at least one stress riser located in said portion that causes stress concentration in said stress field when the rotor is rotating, at least one region of the component around said stress riser having deep compressive residual stresses imparted by laser shock peening, said stress riser is a transition portion of the component between an area of minimum width, in cross section, and a pressure face of the component wherein said pressure face is a contact surface between a complementary dovetail blade slot and dovetail blade root formed between adjacent disk posts circumferentially disposed around a centerline axis of the disk, wherein said region extends inward from a laser shocked surface of the component along said transition portion of the component, wherein the component comprises a blade, said pressure face lies on an exterior facing surface of a dovetail blade root of said blade, and said region and said laser shocked surfaces are radially outward of said face on a shank of said blade which generally connects said root to an airfoil of said blade, and wherein said transition portion is a transition fillet at a root-to-shank interface between said shank and said root.

* * * * *